T. S. Davis
Exhaust Valve.
No. 3,440. Reissued May 18, 1869.
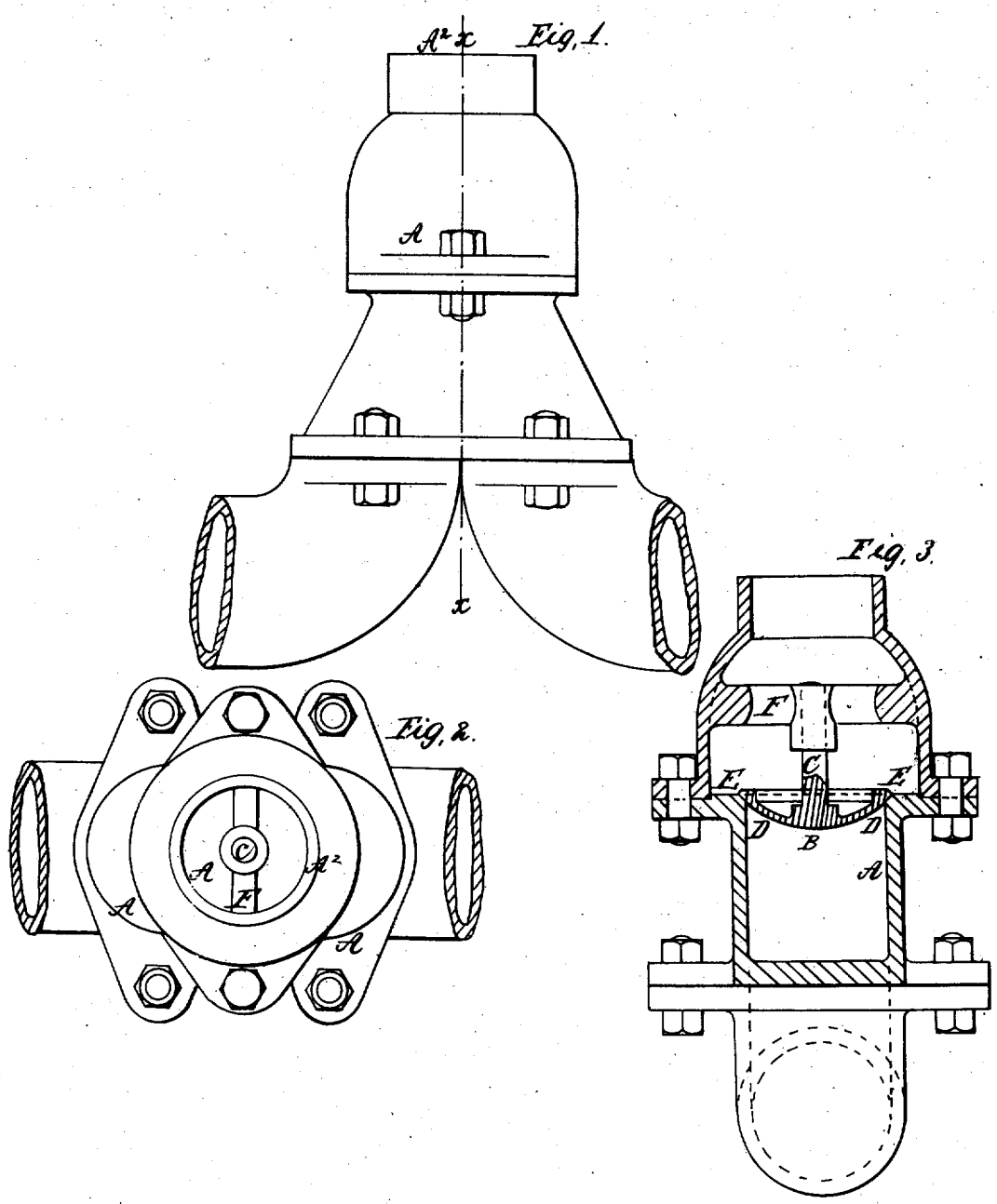
Witnesses
J. M. Bromley
H. L. Wattenberg
Inventor,
T. S. Davis per
his atty
Albert N. Brown

United States Patent Office.

THOMAS S. DAVIS, OF JERSEY CITY, NEW JERSEY.

*Letters Patent No.* 85,289, *dated December* 29, 1868; *antedated December* 23, 1868; *reissue No.* 3,440, *dated May* 18, 1869.

IMPROVEMENT IN STEAM-ENGINE EXHAUST-VALVES.

The Schedule referred to in these Letters Patent and making part of the same.

*To all persons to whom these presents shall come:*

Be it known that I, THOMAS S. DAVIS, of Jersey City, in the county of Hudson, and State of New Jersey, have invented a new and improved Attachment to or Construction of the Exhaust-Passages to Engines; and that the following description, taken in connection with the accompanying drawings, forming a part of this specification, gives a full and complete explanation of the nature and principles of my said improvement, by which my invention may be distinguished from all others, with details of what I consider the best means of carrying out the same in practice.

The principal object is to prevent the access or passage, through the exhaust-passages of locomotive or other engines, to the valve-chests and cylinders of the same, of cinders and detrimental matter.

In the accompanying plate of drawings, my invention is illustrated—

Figure 1 being an elevation of the portion of an exhaust-passage having a valve arranged in it according to the present invention;

Figure 2, a plan or top view of the exhaust-passage shown in fig. 1; and

Figure 3, a vertical section, taken in the plane of the line *x x*, fig. 1.

A, in the drawings, represents an exhaust-passage or tube.

This tube A, at its lower end, is provided with two openings or ports, one alongside of the other, to which pipes or tubes, shown in red lines in the drawings, are to be attached, for forming a connection between the passage A and the exhaust-ports of the steam or piston-cylinder to an engine.

The upper end, $A^2$, of the tube A, when placed in position upon a locomotive-engine, is arranged thereon so as to open into the smoke-chamber of the same, and thus allow the exhaust-steam, passing through the said tube from the cylinder, to escape into the said chamber.

B is a light self-acting valve, of brass or other suitable material, opening freely outward, as represented.

E is a suitable seat for it to rest and fit tightly upon.

Above such seat is fixed a cross-bar, F, having a hole, as represented, for a stem, *c*, of the valve to play through, and thus to guide and steady it in its upward motion from or downward motion to its seat E.

The means of guiding or steadying may be varied at will.

This valve B, when resting on its seat E, tightly closes the said passage A to the inward passage from the smoke-chamber, of any smoke, cinders, coal-dust, heated air, or other deleterious matter, to the cylinder or valve-chest, the valve being only arranged to open outward, for the passage of the exhaust-steam to the smoke-chamber.

With a valve, arranged for operation within the exhaust-passage of an engine, substantially as above described, it is plainly apparent, that while but little obstruction is given to the escape of the exhaust-steam from the cylinder, the entrance of cinders, smoke, coal-dust, heated air, or other deleterious matter from the smoke-chamber, to the cylinder or valve-chest, is entirely and effectually prevented, a result of the utmost importance and advantage in the running of a locomotive-engine, more particularly, as, for instance, when the engine is running without steam in the cylinders, and by its previous-acquired momentum, or when the engine is reversed, in order to stop quickly, for the reason that, in such cases, without the said valve, there would be no hindrance to the passage of cinders, &c., from the smoke-chamber to the cylinder and valve-chest, which cinders, &c., being gritty, would cause great injury to the pistons and valves, as well as to the cylinders and valve-chests, finally destroying and rendering them useless.

And it may be here observed, that while the safety valves of most locomotive engines are sufficient for all ordinary purposes and occasions, they are greatly defective in this respect: that they allow, even when wide open, the pressure in the boiler to accumulate to a fearful extent at times, as, for instance, when the engine, with a heavy train, is moving over a down grade, and it becomes absolutely necessary, for safety, to check the speed of the train, by reversing the engine; for, if then the pressure upon the pistons be not sufficient to hold the driving-wheels, or to turn them backwards, the air from the smoke-box is necessarily pumped into the boiler, thus raising the pressure therein much faster than the safety-valves are able to relieve it, and, as a consequence, either exploding the boiler or collapsing the tubes, the latter, more generally, being the result. This effect, as is obvious, is a source of great annoyance and expense to roads that have heavy grades, and necessarily heavy engines to run their trains; and, consequently, in lieu of reversing the engine, the engineers generally depend upon the ordinary brakes of the cars to retard or hold the train, which are not only complicated but expensive arrangements, while, if the engine could be reversed without danger of exploding the boiler or collapsing the tubes, no better or more perfect and sure brake could be had; and by my invention, as is manifest, the engine is so enabled to be employed, without the least danger thereto or to its boiler, as the inward passage or pumping of the heated air, &c., from the smoke-box cannot possibly occur, but is entirely prevented.

In addition to the several advantages and results above stated as secured by my invention, it may be well to here observe that, as another consequence of the exclusion of gritty particles, heated air, &c., from the cylinders and valve-chests of an engine, less oil is required to be employed to keep the cylinders, &c., lubricated, as the full effect of the steam, for such purposes, is secured, (steam being well known to be a sufficient lubricator therefor,) thus reducing, in that respect, the expense of running the engine.

By the arrangement of the valve B above described, it is left free to close by its own gravity, or by the pressure of the atmosphere within the smoke-box; but springs may be employed in connection with it, if so desired.

In locating the valve within the exhaust-passage, I prefer, for convenience, to place it at the extremity of such passage, the farthest removed from the cylinders, but it may be located at other points; and further, more than one valve may be employed, if so desired.

Having thus described my improvement,

I claim as follows:

I claim the valve B, and its arrangement relating to the seat D in the exhaust-passage A of a locomotive or other analogous engine liable to be reversed, as herein set forth.

In testimony whereof, I have hereunto set my name, in the presence of two subscribing witnesses.

THS. S. DAVIS.

Witnesses:

W. C. DEY,

A. HOERMANN.